(12) United States Patent
Faivre

(10) Patent No.: US 6,546,708 B2
(45) Date of Patent: Apr. 15, 2003

(54) CONTROL ARRANGEMENT FOR AN IMPLEMENT DRAFT TONGUE

(75) Inventor: Damien Faivre, Apremont (FR)

(73) Assignee: Deere & Company, Moline, IL (US)

( * ) Notice: Subject to any disclaimer, the term of this patent is extended or adjusted under 35 U.S.C. 154(b) by 13 days.

(21) Appl. No.: 09/902,076

(22) Filed: Jul. 10, 2001

(65) Prior Publication Data

US 2002/0017089 A1 Feb. 14, 2002

(30) Foreign Application Priority Data

Aug. 8, 2000 (DE) .......................... 100 38 595

(51) Int. Cl.⁷ .................... A01B 73/00; A01D 34/66
(52) U.S. Cl. ............................. 56/15.2; 56/228
(58) Field of Search .................. 56/10.8, 11.9, 56/15.2, 15.5, 15.9, 14.9, 228, 380, 396, DIG. 14

(56) References Cited

U.S. PATENT DOCUMENTS 3,919,831 A   11/1975  Halls et al.
4,558,560 A   12/1985  Koch ......................... 56/228
5,199,250 A *  4/1993  Ermacora et al. ............ 56/15.2
5,642,607 A    7/1997  Stephenson et al. ......... 56/15.1

FOREIGN PATENT DOCUMENTS

| DE | 27 29 811 A | 1/1979 |
| DE | 696 08 193 T2 | 9/1993 |
| DE | 41 38 485 C2 | 7/1995 |
| GB | 628128 A | 8/1949 |

* cited by examiner

Primary Examiner—Robert E. Pezzuto

(57) ABSTRACT

An implement draft tongue is moved through a range of working positions to a transport position extending transverse to the working direction of the implement by an extensible and retractable hydraulic actuator. A control for the hydraulic cylinder includes an interrupter valve that is actuated, in response to a preselected extension of the hydraulic cylinder so as to prevent the cylinder from extending beyond a position for moving the draft tongue to one extreme of its operating range, when an actuating device for the interrupt valve is enabled. When the actuating device for the interrupt valve is disabled, the hydraulic actuator may be extended fully to place the draft tongue in its transport position.

8 Claims, 5 Drawing Sheets

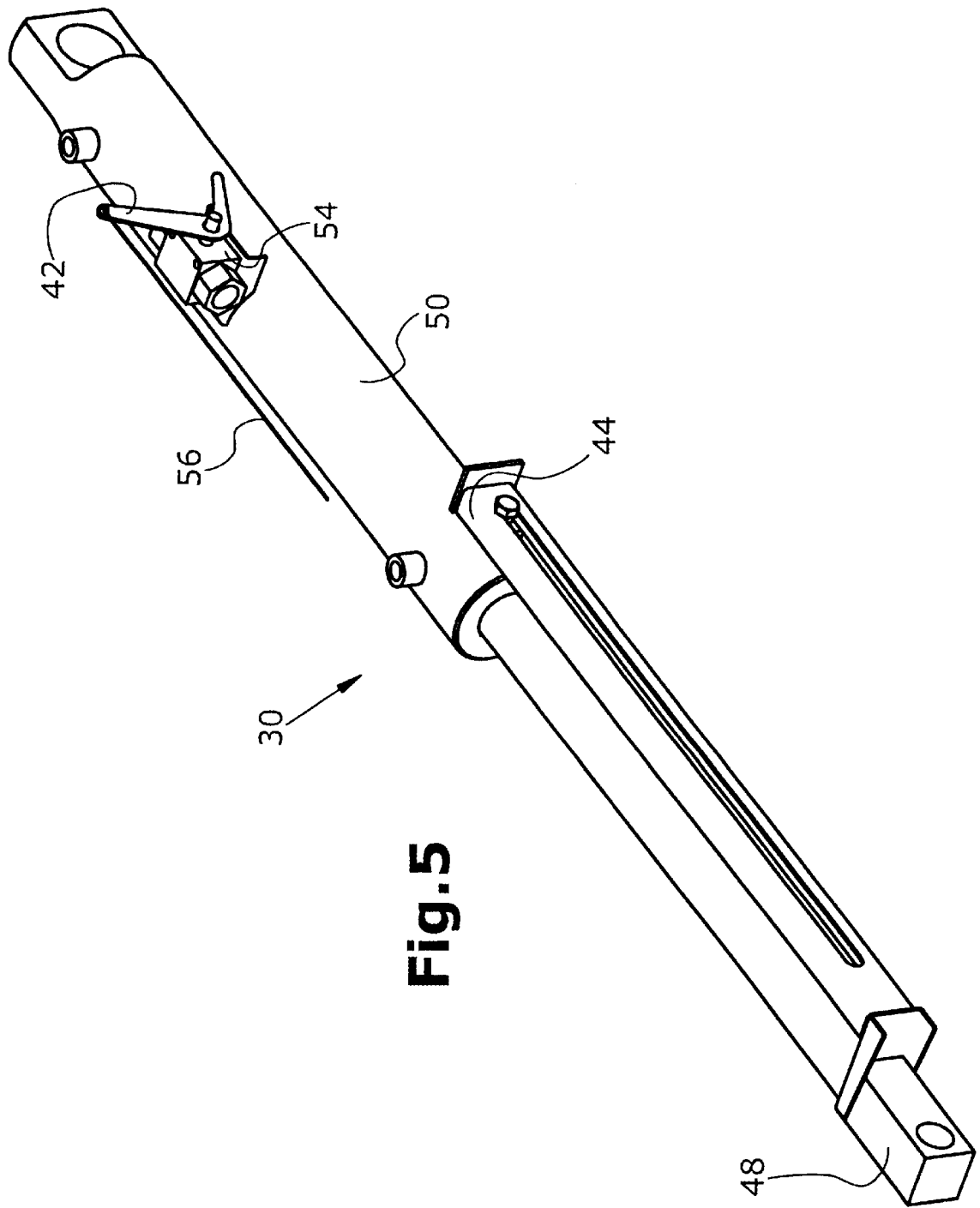

CONTROL ARRANGEMENT FOR AN IMPLEMENT DRAFT TONGUE

FIELD OF THE INVENTION

The invention concerns a control arrangement for a draft tongue of a towed implement, and more particularly relates to a powered arrangement for moving the draft tongue between first, working positions and a second position, wherein the draft tongue extends transverse to the direction of operation of the implement.

BACKGROUND OF THE INVENTION

U.S. Pat. No. 3,919,831 discloses a towed mowing implement with a draft tongue that can be repositioned between operating positions and a transport position by means of a hydraulic cylinder, where the tongue extends transverse to the direction of operation of the mowing implement in the transport position. In the transport position, the mowing implement can be towed on a trailer behind an agricultural tractor or the like. The repositioning movement of the hydraulic cylinder is transmitted by a scissors-like linkage, where the hydraulic cylinder is retracted in the transport position. The effect of the hydraulic motor is controlled jointly by two hydraulic cylinders so that with the full stroke of the hydraulic cylinder once the tongue reaches its transport position and the other time it does not.

U.S. Pat. No. 4,558,560 also discloses a control arrangement, that includes a hydraulic cylinder, for the pivoting of a draft tongue of a mowing implement into a transport position. The hydraulic cylinder operates upon the end of the tongue and is limited in its stroke during the operation by mechanical stops of a plate between the tongue and a frame of the mowing implement. In order to be able to completely retract the pressurized fluid motor and thereby to pivot the tongue into a transport position, the plate with the stops is pivoted into a further position.

The problem underlying the invention is seen in the fact that the cost of known devices for limiting the stroke of the hydraulic cylinder to avoid a stroke leading to the transport position is too great.

SUMMARY OF THE INVENTION

According to the present invention, there is provided an improved control for selectively limiting the stroke of an extensible and retractable hydraulic actuator, used for swinging the draft tongue of a towed implement horizontally, so that during ordinary operation of the implement, the tongue can only be swung through a working range, but which may be placed a state for permitting full extension of the actuator when it is desired that the tongue be placed in a transport position.

An object of the invention is to provide a control arrangement for an implement draft tongue, as discussed above, which is of a simple, inexpensive design.

A more specific object of the invention is to provide a control arrangement, as defined in the above object, which embodies an interrupt valve that is selectively operable to prevent full extension of the hydraulic actuator.

Yet another object of the invention is to provide a control arrangement, as defined in the immediately preceding object, wherein the interrupt valve includes an actuating device that, in an enabled condition, is operated in response to the piston rod reaching a pre-selected state of extension so as to prevent further extension. In the disclosed embodiment, this is accomplished by mounting a switching device to the piston rod, mounting the interrupt valve with its actuating device to the cylinder of the hydraulic actuator, with the actuating device being movable between a an enabled position wherein it is in the path of movement of the switching device so as to be contacted and operated thereby, and a disabled position, wherein it is moved from the path of movement of the switching device.

These and other objects of the invention will become apparent from a reading of the ensuing description together with the appended drawings.

BRIEF DESCRIPTION OF THE DRAWINGS

FIG. 5 is a view, like that of FIG. 3, but showing the hydraulic actuator in a fully extended condition corresponding to the transport position.

DESCRIPTION OF THE PREFERRED EMBODIMENT

Figure 1:
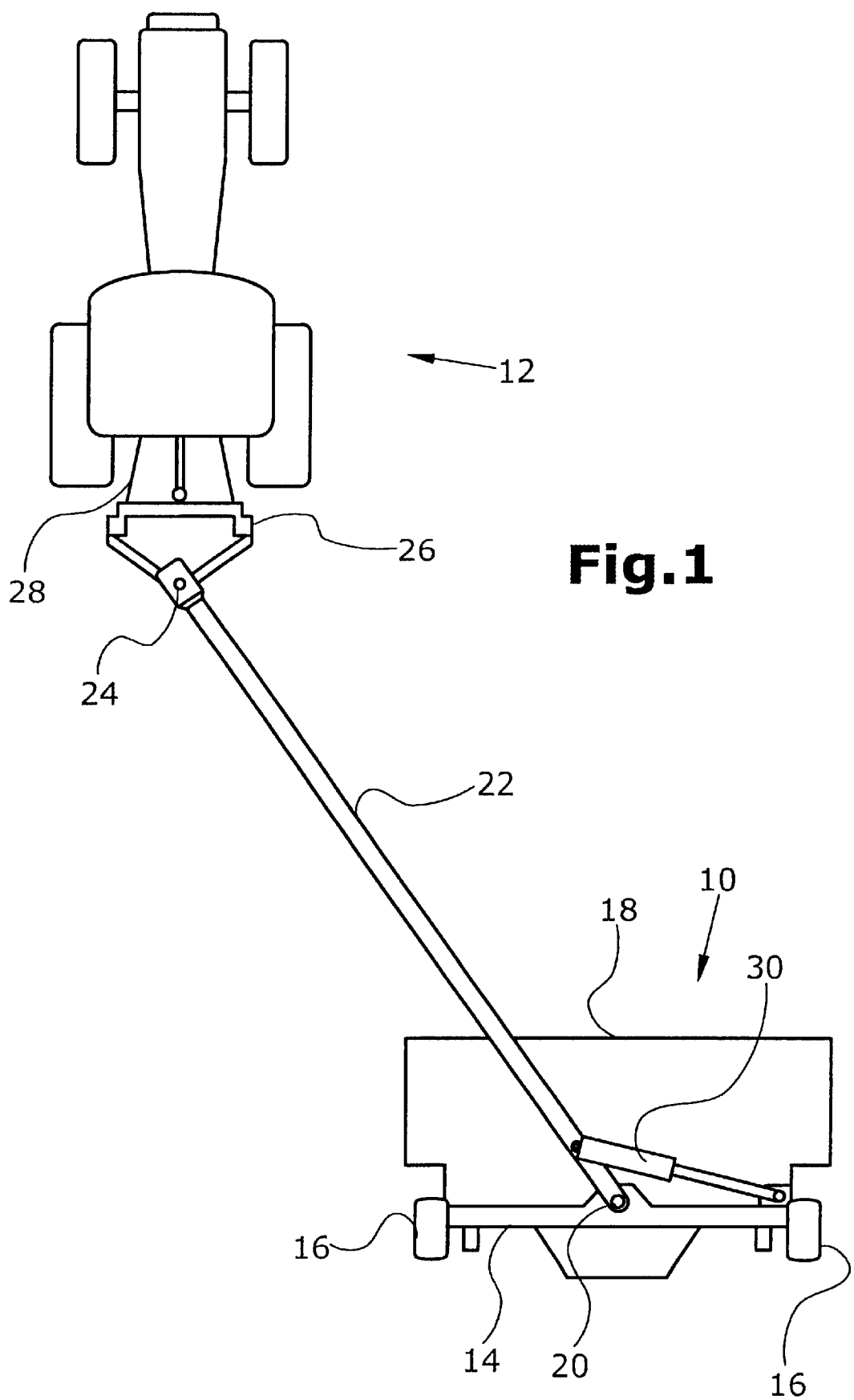
FIG. 1 is a schematic top plan view of a train consisting of a towing vehicle and a towed implement.

Referring now to FIG. 1, there is shown a towed implement 10 and a towing vehicle 12. The implement 10 is configured as a mowing implement, but may, however, be a ground breaking implement, a harvesting implement, a plant processing implement, or any other towed implement.

Figure 2:
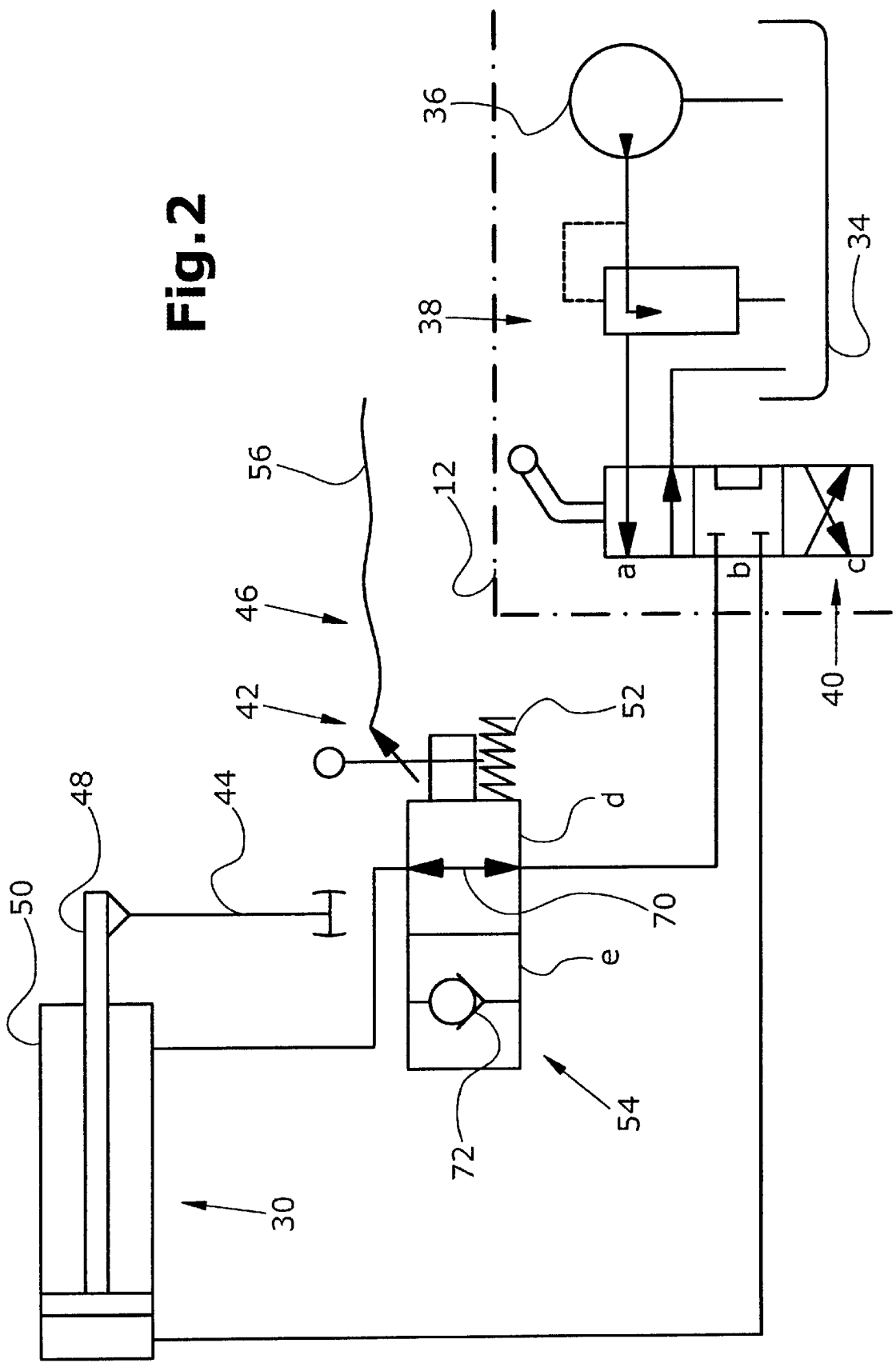
FIG. 2 is a diagram of the hydraulic circuit for controlling an extensible and retractable hydraulic actuator for swinging the draft tongue of the implement.

The implement 10 includes a frame 14 and wheels 16 that support it on the ground and carry a front attached crop mowing and windrowing arrangement 18. A bearing 20 is provided at a center location between opposite ends of the frame 14 and couples a rear end of a draft tongue 22 for swinging transversely thereabout, the forward end of the draft tongue 22 being coupled over a bearing 24 and draft coupler 26 to a draft hitch arrangement 28 of the towing vehicle 12. The relative position of the draft tongue 22 to the frame 14 is controlled by an extensible and retractable hydraulic actuator 30, whose actuation is performed by a control arrangement 32, shown in FIG. 2.

The control arrangement 32 includes a fluid reservoir 34, a pump 36, a pressure relief valve 38, a direction control valve 40, an interrupter valve 54, an actuating device 42, a switching device 44 and a deactivating element 46. The control arrangement 32 is located partially on the implement 10 and partially on the towing vehicle 12, where the deactivating element 46 leads to the towing vehicle in the vicinity of the operator.

The hydraulic actuator 30 is configured as a double-acting hydraulic cylinder and includes a piston rod 48 and a cylinder housing 50 in which the piston rod 48 with its piston, not described in any further detail, is guided in a straight-line motion.

The reservoir 34 is filled with hydraulic fluid that can be drawn by the pupmp 36 over a line, not described in any further detail. The pump 36 is configured for an open system and conducts pressurized hydraulic fluid through the relief valve 38 to the direction control valve 40. A configuration as a closed system would require a few changes but could also be employed. The relief valve 38 operates to return pressurized fluid to the reservoir 34, when the system pressure exceeds a certain threshold, for example, if the valve 40 is open and the actuator 30 has reached one or the other of its end positions.

The direction control valve 40 is configured as a four-way, three-position valve, that is here shown as controlled manually, but may be controlled electrically or hydraulically. In a retracting position "a", pressurized fluid is conducted by the pump 36 to the piston rod end of the cylinder housing 50, and from the head end of the cylinder housing 50 into the reservoir 34. In a neutral position "b", a flow of pressurized fluid is prevented in every direction and the pressurized fluid conducted by the pump 36 is returned to the reservoir 34. In an extension position "c", pressurized fluid is conducted from the pump 36 to the head housing 50 and out of the piston rod end of the cylinder housing 50 into the reservoir 34. Obviously other embodiments of the valve 40 are possible, for example, even valves separated from each other, whose operation attains the same results as the valve 40.

The interrupter valve 54 is configured as a two-way, two-position valve and can be brought into a switch position "d" with a pressurized fluid opening 70 and a switch position "e" with a check valve 72. A spring 52 is provided on the interrupter valve 54 that always forces the interrupter valve 54 into its position "d" with free pressurized fluid flow.

The actuating device 42 is configured as a lever which can also be configured differently with other embodiments, for example, with cams, tilting arms or the like. The actuating device 42 is located in the path of movement of the switching device 44 and can be repositioned by this during the repositioning of the piston rod 48. When the actuating device 42 is grasped by the switching device 44, the interrupter valve 54 moves out of its position "d" into its position "e" and interrupts the pressurized fluid flow out of the hydraulic actuator 30.

The deactivating element 46 is formed in this embodiment by a tension device 56 configured as a rope that acts upon the actuating device 42. When the deactivating element 46 is actuated, the actuating device 42 moves out of the path of movement of switching device 44, which has the result that the interrupter valve 54 remains in its position "d" Until a repositioning by the spring 52 occurs, and the piston rod 48 can be fully extended. The tensioning device 56 extends from an operator's cab of the towing vehicle 12 to the actuating device 42. However, a lever could be provided to which the tensioning device 56 is attached and the tensioning device 56 could also be configured as a push-pull cable control. The arrow shown in the actuating device 42 represents its repositioning capability and should not be confused with an actual embodiment.

Figure 3:
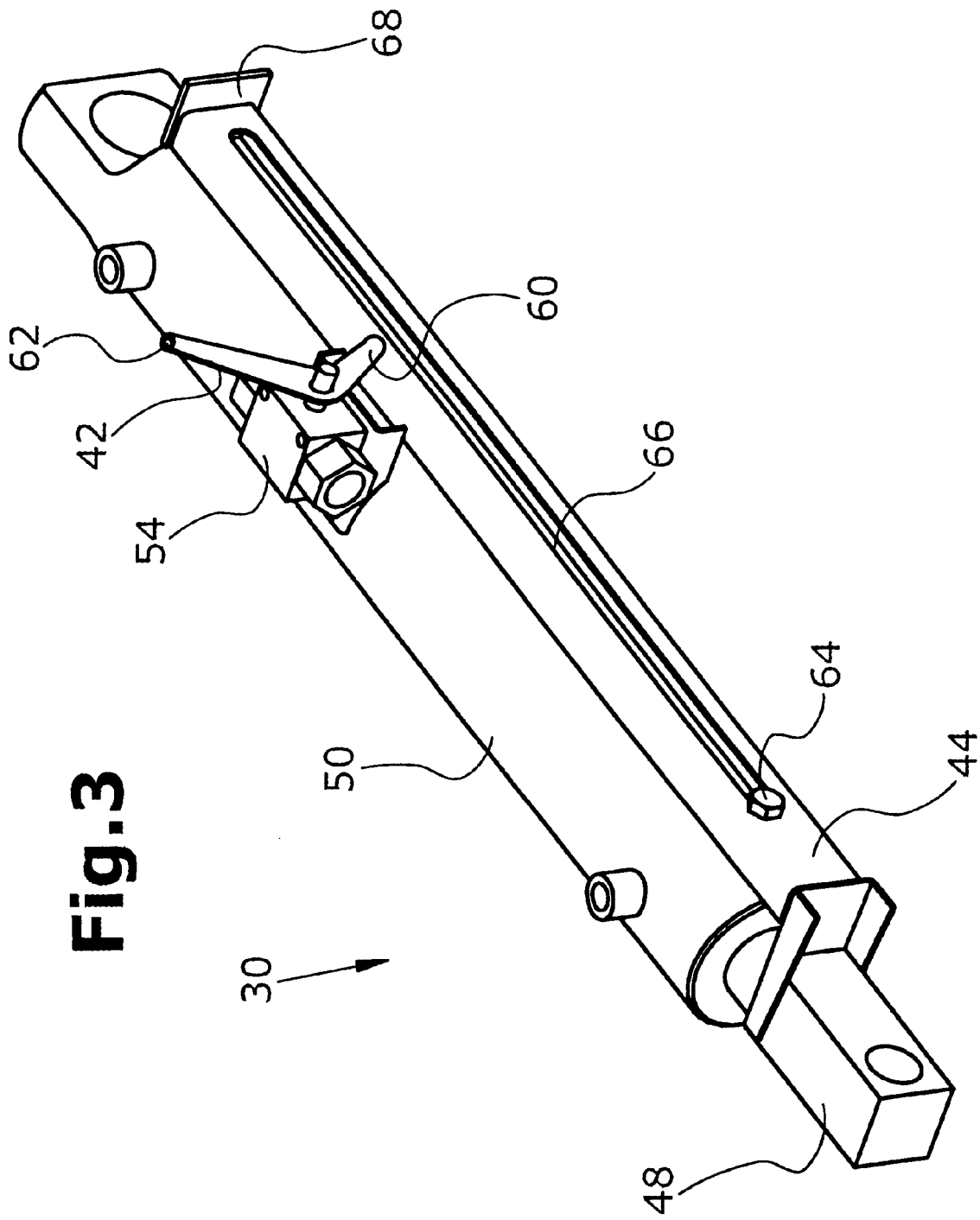
FIG. 3 is a perspective view of the hydraulic actuator shown in its retracted condition.
Figure 4:
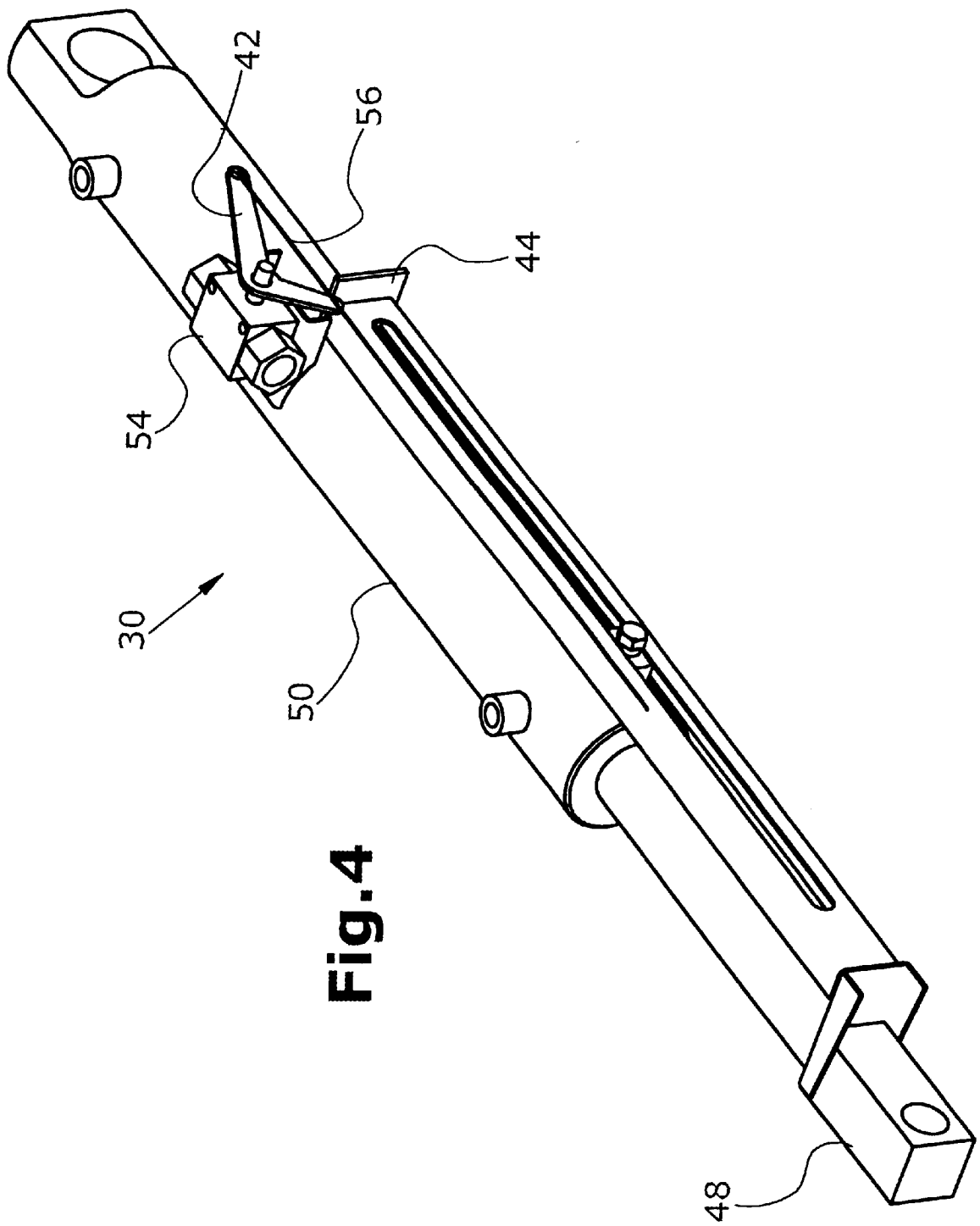
FIG. 4 is a view, like that of FIG. 3, but showing the hydraulic actuator in a partially extended condition in the region of the transition between a range of operating positions and a transport position.

Referring now to FIGS. 3–5, there is shown the details of the hydraulic actuator 30 and part of the control arrangement 32 including the interrupter valve 54, the actuating device 42, the switching device 44 and the deactivating element 46.

The interrupter valve 54 is mounted on the cylinder housing 50, in particular, between its ends at a location that corresponds to the transition region from the range of operating positions to the transport position. The actuating device 42 is configured as a lever pivoted from the interrupter valve 54 with a contact arm 60 and an actuating arm 62. The switching device 44 is configured as an elongate rail having a first end fastened to the free end of the piston rod 48 and which extends in parallel, radially spaced relationship to the cylinder housing 50, and is guided on the cylinder housing 50 by means of a screw 64 received in a slot 66 extending lengthwise in the rail. Provided on the end of switching device 44 that is remote from the piston rod 48 is a stop or abutment 68 in the form of a plate that can be brought into alignment with the contact arm 60 of the actuating device 42. In the retracted condition of the hydraulic actuator 30, the switching device 44 extends generally over the entire length of the cylinder housing 50.

The deactivating element 46, configured as a simple, flexible tensioning element 56, is connected to the actuating arm 62. If tension is applied to the element 56, then the actuating device 42 pivots into its position shown in FIG. 5, in which it cannot be contacted by the stop or abutment 68.

On the basis of the above description, the operation is as follows.

When the direction control valve 40 is in its position "a", the piston rod 48 is retracted, as is shown in FIG. 3. The hydraulic actuator 30 remains in this position as long as the valve 40 is in its position "a" or "b".

In order to extend the hydraulic actuator 30, the valve 40 is brought into its position "c". If the deactivating element 42 is not actuated, the switching device 44, in particular, its stop 68 comes into contact with the contact arm 60 due to the extending movement of the piston rod 48 after a certain path has been covered, and moves the arm 60 so as to reposition the interrupter valve 54 into its position "e", in which the flow of pressurized fluid is interrupted. This position marks the one end of the operating region, as indicated in FIG. 1.

If the hydraulic actuator 30 is to be fully extended, the deactivating element 42 is actuated by a pull on the tension element 56, which acts to pull on the actuating arm 62, before the contact arm 60 comes into contact with the stop 68 so that the contact arm 60 is no longer loaded by the stop 68 and the interrupter valve 54 is no longer brought into its position "e" preventing the return of fluid from the rod end of the actuator 30. The interrupter valve 54 remains in its position "d", the valve 40 in its position "c" and so the piston rod 48 of the hydraulic actuator 30 is extended until it is fully extended whereupon pressure builds and opens the relief valve 38. Other solutions are also conceivable with which the interrupter valve 54 can be brought into its position "d" even during the contact of the arm 60 on the stop 68, and the actuator 30 then extends further.

While in this embodiment, the interrupter valve 54 or the actuating device 42 are provided at the cylinder housing 50 and the switching device 44 is provided at the piston rod 48, this obviously can also be reversed. Furthermore, the actuating device 42 could be provided at the frame 14 or the like; it is essential that the actuating device 42 can be brought into connection with the adjustment path of the hydraulic actuator 30.

Furthermore, the actuating device could be configured in such a way that it can be loaded in one direction, that is when the piston rod 48 is retracted, but by reason of a freewheeling arrangement or the like it cannot bring about a switching movement.

It will be appreciated that the invention can be easily retrofit to existing machines since it merely requires that the switching device 44 and interrupter valve 54 with the actuating device 42 be mounted on the cylinder of the hydraulic actuator normally provided for swinging the implement draft tongue.

Further, it will be appreciated that the interrupter valve 54 could be controlled electrically through the use of a solenoid selectively energized by completing an electrical circuit, for example, through the use switches, light barriers, reed switches or the like that are actuated when the circuit is on and the hydraulic actuator 30 reaches a pre-selected state of extension. The deactivating element can also be controlled remotely without wiring if desired.

Having described the preferred embodiment, it will become apparent that various modifications can be made without departing from the scope of the invention as defined in the accompanying claims.

What is claimed is:

1. In a control arrangement for a draft tongue of a towed implement, wherein an extensible and retractable hydraulic actuator, including a piston rod and cylinder, is coupled between the draft tongue and a frame of the implement for selectively shifting the tongue transversely within a working range and a transport position beyond the working range, and a hydraulic circuit including a direction control valve being coupled between a source of fluid pressure and said hydraulic actuator for effecting desired operation of said hydraulic actuator, the improvement comprising: said hydraulic circuit further including an interrupter valve located in the circuit between said direction control valve and said hydraulic actuator and normally being in a first position permitting the free flow of fluid between said direction control valve and said hydraulic cylinder; an actuating device coupled to said interrupter valve; and a switching device associated with said hydraulic actuator and being responsive to the relative position between said piston rod and cylinder of said actuator for operating said actuating device so as to move said interrupting valve into a second position wherein said interrupting valve blocks flow from said hydraulic actuator so as to prevent said hydraulic actuator from extending beyond a position corresponding to an end of said working range of said tongue.

2. The control arrangement as defined in claim 1 wherein said switching device is connected for movement with said piston rod.

3. The control arrangement as defined in claim 1 wherein said actuating device may be moved to a disabled position; and said switching device being incapable of operating said actuating device when said actuating device is in said disabled position.

4. The control arrangement as defined in claim 3 and further including a remotely operable deactivating arrangement coupled to said actuating device for selectively moving it to said disabled position.

5. The control arrangement as defined in claim 4 wherein said deactivating arrangement includes a tension device.

6. The control arrangement as defined in claim 5 wherein said switching device is connected for movement with said piston rod; said actuating device is a two-armed pivoted lever having a first arm located for being contacted by said switching device unless said actuating device is in a disabled position; said tension device being coupled to a second arm of said lever and being operable for moving said actuating device into its disabled position.

7. The control arrangement as defined in claim 6 wherein said switching device includes a rail which extends alongside, and approximately the entire length of, said cylinder when said actuator is fully retracted; said rail and cylinder including cooperating structure guiding the movement of said rail; a stop being fixed to said rail for engaging said actuating device unless said actuating device is in said disabled position; and said interrupter valve being mounted to said cylinder of said hydraulic actuator.

8. The control arrangement as defined in claim 1 wherein said interrupter valve includes a check valve which prevents flow from returning from said hydraulic actuator when said interrupter valve is in its second position.

* * * * *